United States Patent
Liu et al.

(10) Patent No.: US 9,874,959 B2
(45) Date of Patent: Jan. 23, 2018

(54) ARRAY SUBSTRATE, TOUCH CONTROL DISPLAY DEVICE AND TOUCH CONTROL DRIVING METHOD

(71) Applicants: BOE Technology Group Co., Ltd., Beijing (CN); Beijing BOE Optoelectronics Technology Co., Ltd., Beijing (CN)

(72) Inventors: Yingming Liu, Beijing (CN); Xue Dong, Beijing (CN); Haisheng Wang, Beijing (CN); Xiaoliang Ding, Beijing (CN); Shengji Yang, Beijing (CN); Weijie Zhao, Beijing (CN); Hongjuan Liu, Beijing (CN); Lei Wang, Beijing (CN); Changfeng Li, Beijing (CN); Wei Liu, Beijing (CN)

(73) Assignees: BOE Technology Group Co., Ltd., Beijing (CN); Beijing BOE Optoelectronics Technology Co., Ltd., Beijing (CN)

(*) Notice: Subject to any disclaimer, the term of this patent is extended or adjusted under 35 U.S.C. 154(b) by 0 days.

(21) Appl. No.: 14/755,455

(22) Filed: Jun. 30, 2015

(65) Prior Publication Data
US 2016/0283002 A1 Sep. 29, 2016

(30) Foreign Application Priority Data
Mar. 23, 2015 (CN) .......................... 2015 1 0126520

(51) Int. Cl.
*G06F 3/041* (2006.01)
*G06F 3/044* (2006.01)

(52) U.S. Cl.
CPC ............ *G06F 3/0412* (2013.01); *G06F 3/044* (2013.01); *G06F 3/0416* (2013.01); *G06F 2203/04103* (2013.01)

(58) Field of Classification Search
CPC ...... G06F 3/0412; G06F 3/0416; G06F 3/044; G06F 3/047
See application file for complete search history.

(56) References Cited

U.S. PATENT DOCUMENTS

| | | | |
|---|---|---|---|
| 2012/0169626 A1* | 7/2012 | Hsieh | G06F 3/044 345/173 |
| 2014/0184944 A1* | 7/2014 | Ma | G02F 1/134363 349/12 |
| 2015/0185939 A1* | 7/2015 | Han | G06F 3/0412 345/173 |

FOREIGN PATENT DOCUMENTS

| | | |
|---|---|---|
| CN | 102169141 A | 8/2011 |
| CN | 102253752 A | 11/2011 |

(Continued)

OTHER PUBLICATIONS

Mar. 27, 2017—(CN) First Office Action Appn 201510126520.1 with English Tran.

(Continued)

*Primary Examiner* — Sahlu Okebato
(74) *Attorney, Agent, or Firm* — Banner & Witcoff, Ltd.

(57) ABSTRACT

The invention discloses an array substrate, a touch control display device and a touch control driving method. The array substrate comprises a common electrode layer, comprising: touch control driving electrodes and common electrodes insulated from one another and arranged in an intersecting manner, each of the touch control driving electrodes being loaded a common electrode signal and a touch control scanning signal in a time-sequence manner and comprising touch control driving sub-electrodes arranged along an extending direction of thereof at an interval and each being positioned between adjacent common electrodes; pixel units; and touch control driving lines, arranged in a same layer as data lines or gate lines, an extending direction (Continued)

thereof being same as that of the touch control driving electrode, and touch control driving sub-electrodes of each of the touch control driving electrodes being electrically connected by at least one of the touch control driving line.

14 Claims, 6 Drawing Sheets

(56) References Cited

FOREIGN PATENT DOCUMENTS

| CN | 102955637 A | 3/2013 |
| CN | 103049157 A | 4/2013 |
| CN | 103150069 A | 6/2013 |
| CN | 103268178 A | 8/2013 |
| CN | 103838431 A | 6/2014 |

OTHER PUBLICATIONS

Nov. 8, 2017—(CN) Second Office Action Appn No. 201510126520.1 with English Tran.

* cited by examiner

ARRAY SUBSTRATE, TOUCH CONTROL DISPLAY DEVICE AND TOUCH CONTROL DRIVING METHOD

This application claims priority to Chinese Patent Application No. 201510126520.1 filed on Mar. 23, 2015. The present application claims priority to and the benefit of the above-identified application and is incorporated herein in its entirety.

TECHNICAL FIELD

Embodiments of the invention relate to an array substrate, a touch control display device and a touch control driving method.

BACKGROUND

An in-cell touch panel is a device which integrates a touch screen and a display screen, with touch driving electrodes and touch sensing electrodes integrated in the display screen, to implement functions of touch control and image displaying at the same time. The in-cell touch panel has gradually become a mainstream in a display field, due to characteristics such as simple structure, lightness and thinness.

For a conventional capacitive in-cell touch panel, touch control driving electrodes and touch control sensing electrodes are additionally arranged on a conventional array substrate directly, namely, two layers of strip-shaped Indium Tin Oxide (ITO) electrodes which are intercrossed in different planes are manufactured on a surface of the array substrate, and the two layers of ITO electrodes serve as the touch control driving electrodes and the touch control sensing electrodes of the touch panel, respectively.

However, when the array substrate for use in the capacitive in-cell touch panel is manufactured, an extra process needs to be adopted to reduce a ground capacitance of the touch control driving electrodes (for example, the capacitance of the touch control driving electrodes between a gate line or a data line), so as to reduce a signal transmission load of the touch control driving electrodes, so the manufacturing cost is high and the production efficiency is low.

SUMMARY OF THE INVENTION

Embodiments of the invention provide an array substrate, a touch control display device and a touch control driving method, which can reduce production cost of the array substrate of a capacitive in-cell touch panel and improve production efficiency while reducing the signal transmission load of a touch control driving electrode.

In one aspect, an embodiment of the invention provides an array substrate, comprising: a common electrode layer, comprising: a plurality of touch control driving electrodes and a plurality of common electrodes which are insulated from one another and are arranged in an intersecting manner, the touch control driving electrodes being configured to load a common electrode signal and a touch control scanning signal in a time-sequence manner, each touch control driving electrode comprising a plurality of touch control driving sub-electrodes which are arranged along an extending direction of the touch control driving electrode at an interval, and each touch control driving sub-electrode being positioned between adjacent common electrodes; a plurality of pixel units, arrayed in a matrix and are defined by a plurality of gate lines and a plurality of data lines intersecting with each other; and a plurality of touch control driving lines, arranged in a same layer as the data lines or the gate lines of the array substrate and are parallel to each other, an extending direction of each touch control driving line being same as the extending direction of the touch control driving electrode, and the plurality of touch control driving sub-electrodes comprised by each of the touch control driving electrodes being electrically connected by at least one of the touch control driving line.

In another aspect, an embodiment of the invention further provides a touch control display device, comprising: an opposed substrate; and an array substrate, cell-assembled with the opposed substrate, wherein the array substrate is the array substrate as described above.

In still another aspect, an embodiment of the invention further provides a touch control driving method of the touch control display device described above, comprising: in a display period, applying a common electrode signal to the touch control driving electrodes; and in a touch control period, applying a touch control scanning signal to the touch control driving electrodes and the data lines and/or the gate lines.

BRIEF DESCRIPTION OF THE DRAWINGS

In order to clearly illustrate the technical solution of the embodiments of the invention, the drawings of the embodiments will be briefly described in the following; it is obvious that the described drawings are only related to some embodiments of the invention and thus are not limitative of the invention.

DESCRIPTION OF THE EMBODIMENTS

In order to make objects, technical details and advantages of the embodiments of the invention apparent, the technical solutions of the embodiment will be described in a clearly and fully understandable way in connection with the drawings related to the embodiments of the invention. It is obvious that the described embodiments are just a part but not all of the embodiments of the invention. Based on the described embodiments herein, those skilled in the art can obtain other embodiment(s), without any inventive work, which should be within the scope of the invention.

Figure 1:
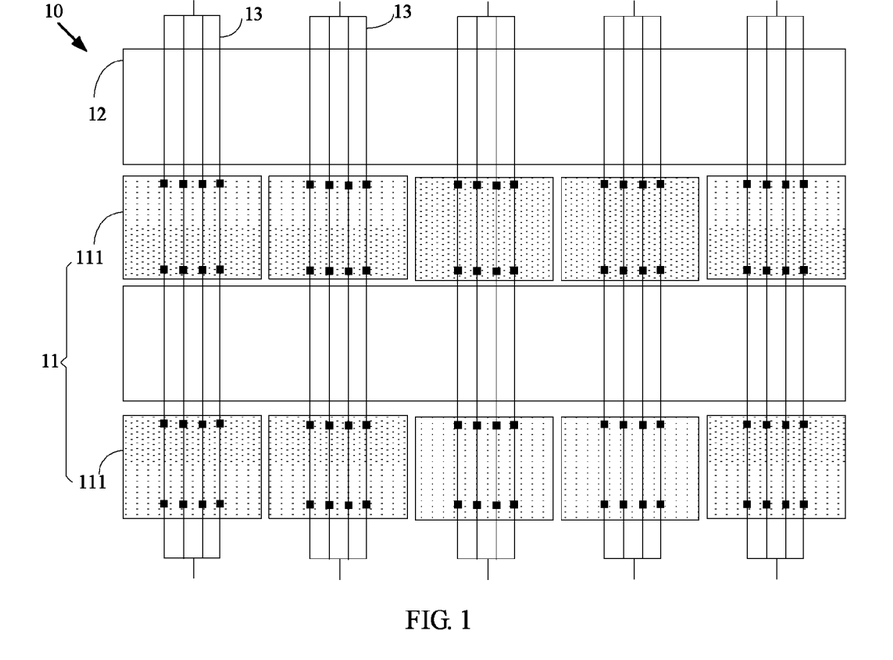
FIG. 1 is a top-view structural schematic diagram of an array substrate provided by an embodiment of the invention.

FIG. 1 is a structural schematic diagram of an array substrate provided by an embodiment of the invention. With reference to FIG. 1, the array substrate provided by the embodiment comprises a common electrode layer 10, including a plurality of touch control driving electrodes 11 and a plurality of common electrodes 12 insulated to each other, the touch control driving electrodes 11 and the common electrodes 12 being arranged in an intersecting manner, the touch control driving electrodes 11 being configured to load a common electrode signal and a touch control scanning signal in a time-sequence manner. Each of the touch control driving electrodes 11 comprises a plurality of touch control driving sub-electrodes 111 which are arranged along an extending direction of the touch control driving electrode 11 at an interval, and each touch control driving sub-electrode 111 being positioned between adjacent common electrodes 12.

In the embodiment of the present invention, the common electrode layer on a whole surface of the array substrate is segmented to form a plurality of touch control driving electrodes 11 and a plurality of common electrodes 12 which are insulated from one another and are arranged in an intersecting manner. The touch control driving electrodes 11 are driven in a time-sequence manner to realize a touch control function and a display function. That is, when the touch control function needs to be realized, a touch control scanning signal is loaded to the touch control driving electrodes 11; when the display function needs to be realized, a common electrode signal is loaded to the common electrodes 12 and the touch control driving electrodes 11 at the same time. A time-sequence driving manner is adopted in a touch control stage and a display stage; on one hand, a display driving chip and a touch control driving chip can be integrated, the production cost can be reduced; and on the other hand, an interference between displaying and touch control can be reduced, to improve picture quality and touch control accuracy.

The array substrate provided by the embodiment of the invention further comprises a plurality of touch control driving lines 13 arranged in a same layer as data lines of the array substrate, and the touch control driving sub-electrodes 111 of each touch control driving electrode 11 are electrically connected by the plurality of touch control driving lines 13. For example, four touch control driving lines 13 in FIG. 1 are electrically connected with the touch control driving sub-electrodes 111 of one touch control driving electrode 11. Exemplarily, each touch control driving line is connected with each of corresponding touch control driving sub-electrodes through at least one through hole, for example, two. The touch control driving electrode 11 consisting of the plurality of touch control driving sub-electrodes 111 provided by the embodiment of the invention is electrically connected with the touch control driving electrode lines 13; as the common electrode layer is generally made of transparent electrode material such as ITO material, and resistance of the ITO material is higher, after the touch control driving lines 13 and the touch control driving electrode 11 are electrically connected, it is equivalent to that an ITO electrode and metal consisting of the plurality of touch control driving lines 13 are connected in parallel; in this way, the resistance of the touch control driving electrodes 11 can be minimized, and thus a signal transmission load of the touch control driving electrodes 11 can be reduced, so as to increase a signal transmission speed of the electrodes.

Figure 2:
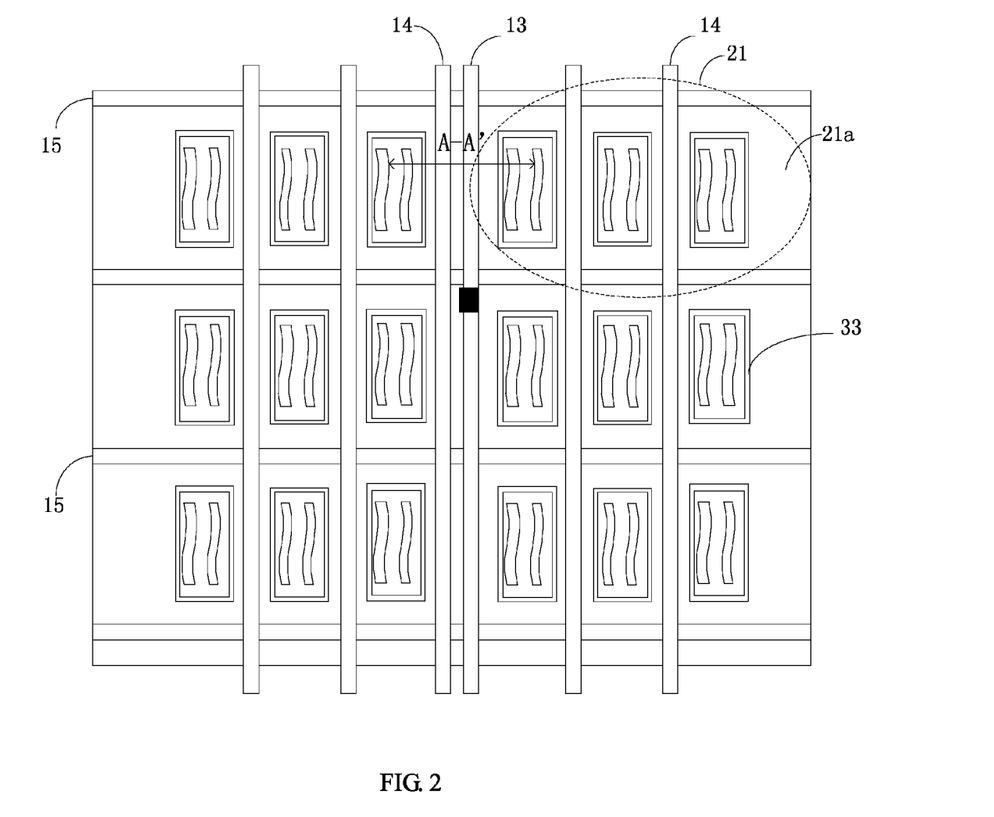
FIG. 2 is a partially enlarged top-view structural schematic diagram of the array substrate provided by the embodiment of the invention.

In combination with FIG. 2, a plurality of pixel units 21 which are arranged in a matrix are formed on the array substrate in the embodiment of the invention. In FIG. 2, only two pixel units 21 are taken as an example for description; and a dotted line circle in the diagram shows one pixel unit 21. It can be seen from FIG. 2 that one touch control driving line 13 is arranged between two adjacent pixel units, and the touch control driving line 13 and a data line 14 are same in an extending direction and are arranged at an interval. In the same way, in a direction perpendicular to the extending direction of the touch control driving line 13, one touch control driving line 13 is arranged between every two adjacent pixel units 21. As one touch control driving line is arranged between every two adjacent pixel units in the embodiment of the invention, and a display precision is generally greater than a touch control precision, each touch control driving electrode corresponds to a plurality of touch control driving lines and is electrically connected with the corresponding plurality of touch control driving lines, so the touch control driving line 13 and the touch control driving sub-electrodes 111 can be better connected, the resistance of the touch control driving electrode 11 can be reduced at the greatest extent, and crosstalk among the touch control driving lines 13 can be reduced. In addition, as the touch control driving line 13 is not arranged at a frame, a narrow frame design can be realized.

It should be noted that in the embodiment of the invention, each pixel unit 21 in FIG. 2 includes three sub-pixel units 21a; and if the influence to the display effect is not considered, the touch control driving line may also be arranged between adjacent sub-pixel units 21a to further increase the number of the touch control driving lines.

In the embodiment of the invention, both ends of a plurality of touch control driving lines 13 electrically connected with the same one touch control driving electrode 11 are connected together. For example, in FIG. 1, both ends of the four touch control driving lines 13 electrically connected with the same one touch control driving electrode 11 are connected together. Both ends of the plurality of touch control driving lines 13 electrically connected with the same one touch control driving electrode 11 are connected together, so a signal transmission synchronization degree is improved, an anti-interference capability is higher, and a picture quality is further improved.

Figure 3:
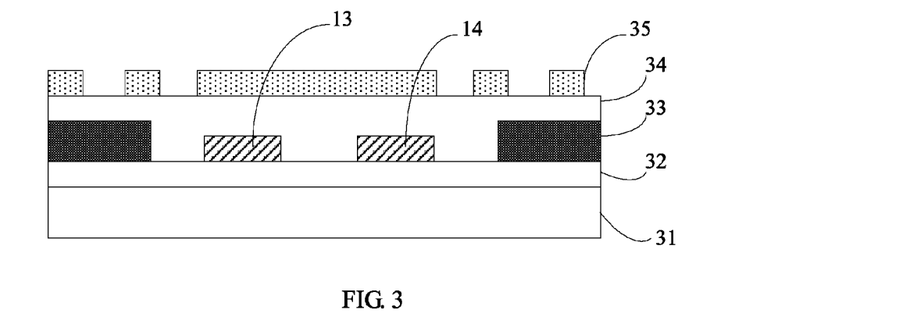
FIG. 3 is a cross-sectional schematic diagram of the array substrate provided by the embodiment of the invention along an A-A' line in FIG. 2.

FIG. 3 is a cross-sectional schematic diagram of the array substrate provided by the embodiment of the invention along an A-A' line in FIG. 2. As shown in FIG. 3, the array substrate of the embodiment of the invention comprises a substrate 31; a gate line 15 formed on the substrate 31 (see FIG. 2); a gate insulating layer 32 formed on the gate line 15 in a covering manner; an active layer (not shown), pixel electrodes 33, source and drain electrodes (not shown), the data line 14 and the touch control driving line 13, which are formed on the gate insulating layer 32; an insulating layer 34 formed in a covering manner; and a common electrode layer 35 formed on the insulating layer 34.

It can be seen from FIG. 3 that the touch control driving line 13 and the data line 14 in the embodiment of the invention are arranged in a same layer, and the touch control driving line 13 and the data line 14 are same in an extending direction and are arranged at an interval. As the touch control driving line 13 and the data line 14 are arranged in the same layer, it is unnecessary to add an extra manufacturing process when the array substrate is manufactured, and patterns of the touch control driving line 13 and the data line 14 may be formed by one patterning process, thus saving the manufacturing cost and improving additional value of a product.

Exemplarily, the touch control driving electrode 11 may extend along a column direction of the pixel units 21; as the touch control driving line 13 and the touch control driving electrode 11 are same in the extending direction, the touch control driving line 13 also may extend along the column direction of the pixel units 21; and at this time, the touch control driving line 13 is located at an gap between adjacent columns of pixel units 21.

As in the embodiment, the touch control driving line 13 and the data line 14 are arranged in the same layer, the touch control driving line 13 and the data line 14 are same in the extending direction; and generally, the data line 14 extends along the column direction of the pixel units 21, the embodiment will be described by taking that the touch control driving electrode 11 and the data line 14 extend along the column direction of the pixel units 21 as an example. Exemplarily, as the touch control driving electrode 11 and the common electrode 12 are insulated from one another and are arranged in an intersecting manner, as shown in FIG. 1, the common electrode 12 extends along a row direction of the pixel units 21. Exemplarily, the common electrode 12 is formed as a strip-shaped electrode.

Exemplarily, the touch control driving line 13 may be of a Mo/Al/Mo laminated structure; as Al is smaller in resistance and Mo is higher in oxidation resistance, the signal transmission speed can be ensured and the service life can be prolonged by adopting such a laminated structure. Certainly, the touch control driving line 13 may also be a single layer structure of metal such as Al, Cu or the like.

Figure 7:
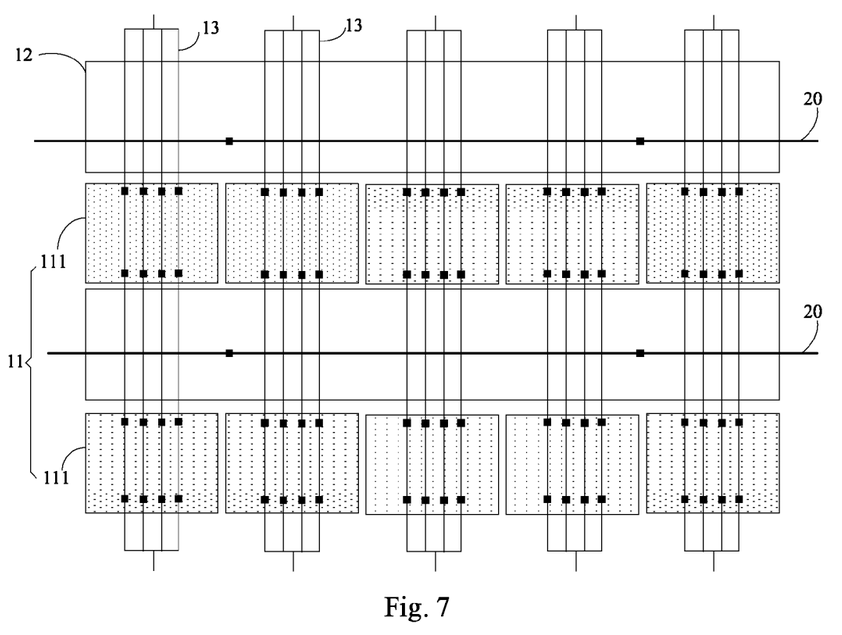
FIG. 7 is a top-view structural schematic diagram of an array substrate provided by an embodiment of the invention.

Exemplarily, the array substrate of the embodiment of the invention may further comprises a plurality of common electrode signal lines, and the common electrode 12 is electrically connected with the common electrode signal line 20 (e.g. as shown in FIG. 7). During actual implementation, the common electrode signal line may extend along the row direction of the pixel units 12. Certainly, each of the common electrode signal lines may also extend along the column direction of the pixel units 21 and are located at a gap between adjacent rows of pixel units 21, and herein the extending direction of the common electrode signal line is not specifically defined.

Figure 8:
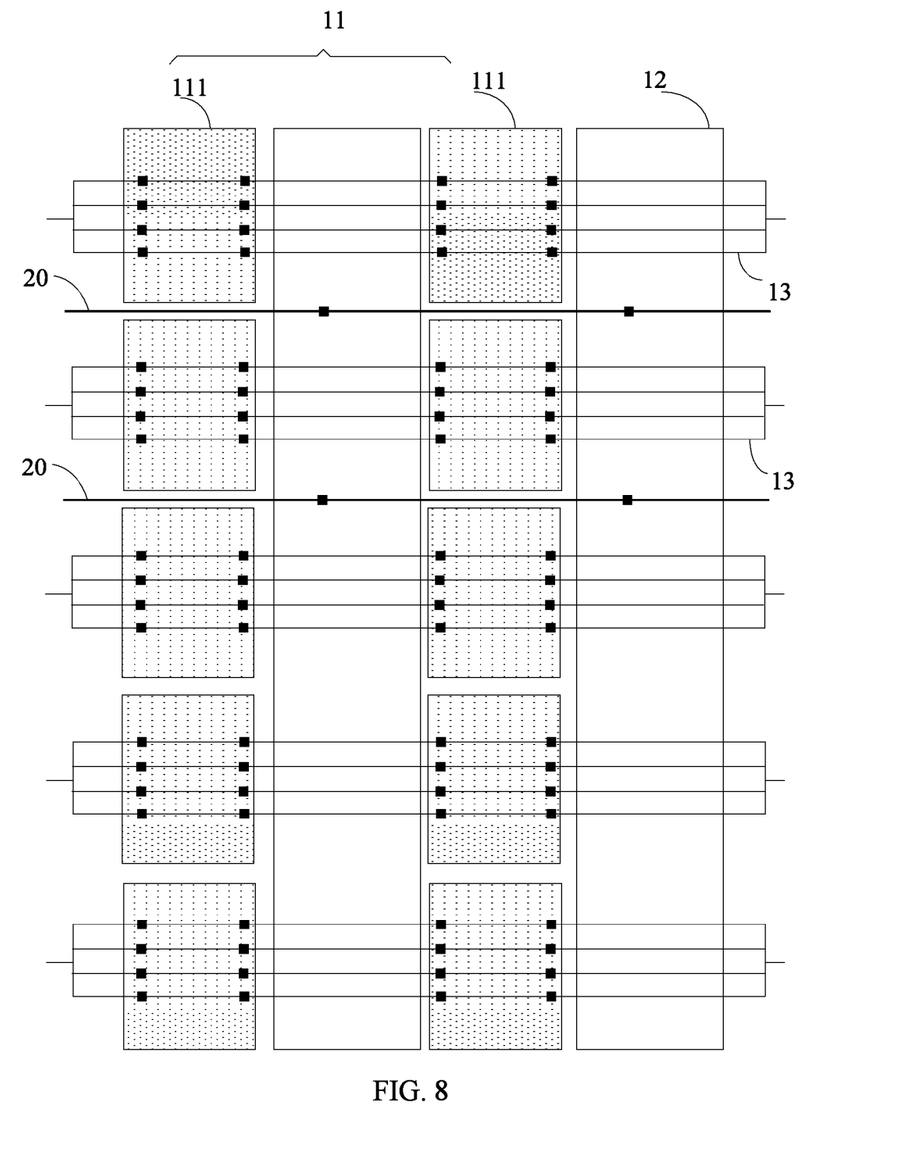
FIG. 8 is a top-view structural schematic diagram of an array substrate provided by another embodiment of the invention.

For example, when each of the common electrode signal lines extends along the row direction of the pixel units 21, the common electrode signal line 20 and the gate line of the array substrate may be arranged in a same layer, and the common electrode signal line 20 is electrically connected with each of corresponding common electrodes 12 through at least one through hole (e.g. as shown in FIG. 8). Thus, it is unnecessary to add an extra manufacturing process when the array substrate is manufactured, and patterns of the common electrode signal line and the gate line may be formed by one patterning process, thus saving the cost and improving additional value of a product.

Furthermore, as the common electrode layer is generally made of transparent electrode material such as ITO material, and resistance of the ITO material is higher, after the common electrode signal line made of metal and the common electrode 12 are electrically connected, it is equivalent to that an ITO electrode and metal consisting of the plurality of common electrode signal lines are connected in parallel; in this way, the resistance of the common electrode signal line 12 can be minimized, so as to increase a signal transmission speed of the electrode.

Figure 4:
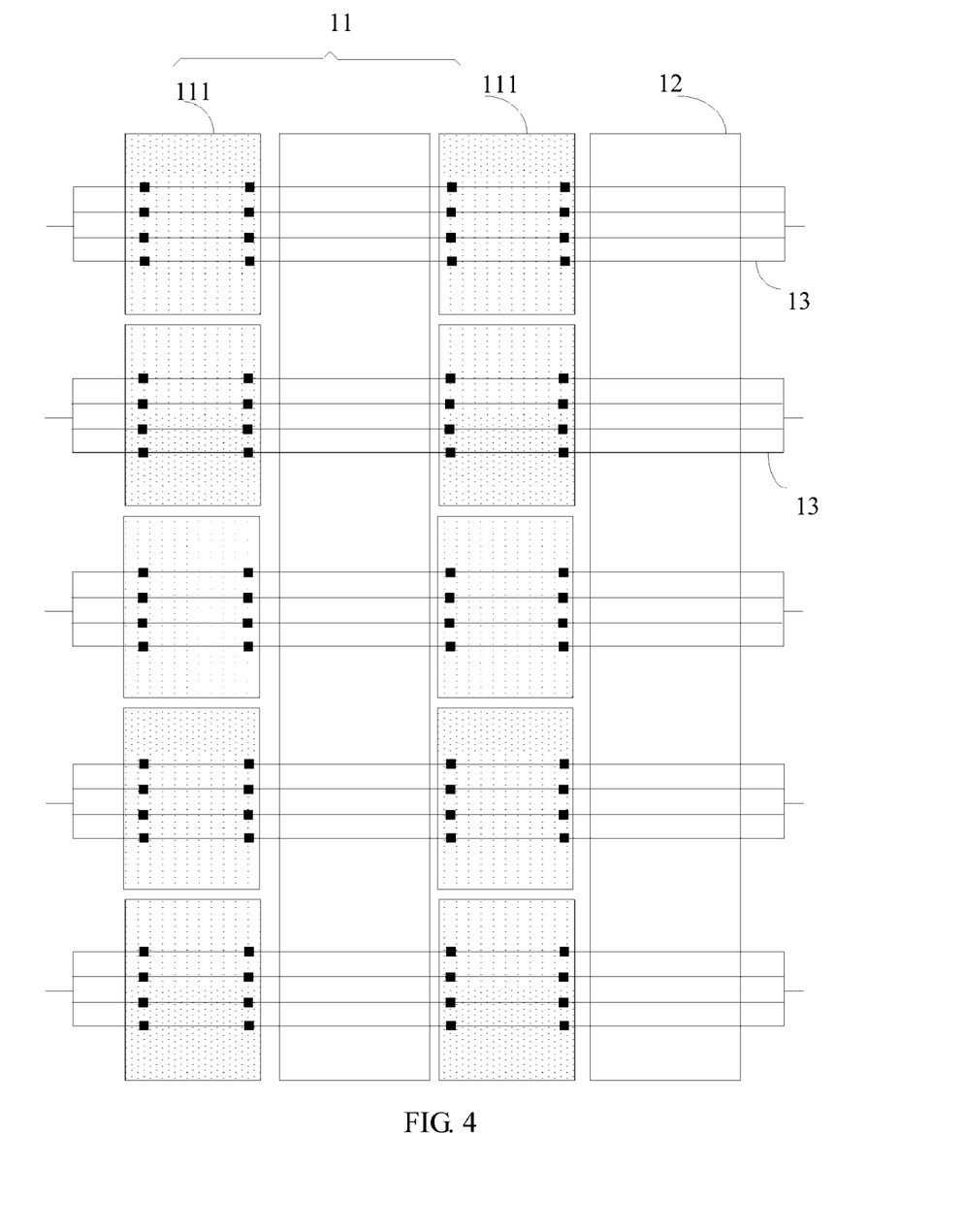
FIG. 4 shows a top-view structural schematic diagram of another array substrate provided by an embodiment of the invention.

FIG. 4 shows a top-view structural schematic diagram of another array substrate provided by an embodiment of the invention. The array substrate shown as in FIG. 4 is substantially same as the array substrate shown in FIGS. 1-3 in structure and the difference is that the touch control driving line 13 and the gate line of the array substrate in this embodiment are arranged in a same layer.

As in this embodiment, the touch control driving line 13 and the gate line are arranged in the same layer, the touch control driving line 13 and the gate line of the array substrate are same in an extending direction; and generally, the gate line extends along the row direction of the pixel units 21, the embodiment will be described by taking that the touch control driving electrode 11 and the gate line extend along the row direction of the pixel units 21 as an example.

Therefore, in the embodiment as shown in FIG. 4, the touch control driving electrode 11 extends along the row direction of the pixel units 21; at this time, the touch control driving line 13 also extends along the row direction of the pixel units 21, and the touch control driving line 13 is located at an gap between adjacent rows of pixel units 21. Similarly, as the touch control driving electrode 11 and the common electrode 12 are insulated from one another and are arranged in an intersecting manner, as shown in FIG. 4, the common electrode 12 extends along the column direction of the pixel units 21. For example, the common electrode 12 may be arranged as a strip-shaped electrode.

The touch control driving line and the gate line in this embodiment are arranged in the same layer, so it is unnecessary to add an extra manufacturing process when the array substrate is manufactured, and patterns of the touch control driving line and the gate line may be formed by one patterning process, thus saving the cost and improving additional value of a product. In addition, the touch control driving electrode consisting of a plurality of touch control driving sub-electrodes and the touch control driving electrode line provided by the embodiment of the present invention are electrically connected, as the common electrode layer is generally made of ITO material, and resistance of the ITO material is higher, after the touch control driving line and the touch control driving electrode are electrically connected, it is equivalent to that an ITO electrode and metal consisting of the plurality of touch control driving lines are connected in parallel; in this way, the resistance of the touch control driving electrode is minimized, and thus a signal transmission load of the touch control driving electrode can be reduced, so as to increase a signal transmission speed of the electrode.

An embodiment of the invention further provides a manufacturing method of an array substrate, which may be used for manufacturing the array substrate provided by embodiments as shown in FIGS. 1-3, and the manufacturing method comprises:

Step 401: providing a substrate.

Step 402: forming a pattern including a gate line.

Exemplarily, if a common electrode signal line and the gate line are arranged in a same layer, the pattern formed in step 402 further includes the common electrode signal line.

Step 403: forming a gate insulating layer.

Step 404: forming an active layer.

Step 405: forming a pixel electrode.

Step 406: forming a pattern including a source electrode, a drain electrode, a data line and a touch control driving line;

Wherein, the touch control driving line and the data line are same in extending direction and are arranged at an interval.

Step 407: forming an insulating layer, and forming a through hole at a position corresponding to the touch control driving line in the insulating layer.

Step 408: forming a common electrode layer, including a plurality of touch control driving electrodes and a plurality of common electrodes insulated to each other, the touch control driving electrodes and the common electrodes being arranged in an intersecting manner, the touch control driving electrode being used for loading a common electrode signal and a touch control scanning signal in a time-sequence manner, each touch control driving electrode including a plurality of touch control driving sub-electrodes which are arranged along an extending direction of the touch control driving electrode and are spaced from each other, each touch control driving sub-electrode being positioned between adjacent common electrodes, and all of the touch control driving sub-electrodes of each touch control driving electrode being electrically connected by a plurality of touch control driving lines.

In the above steps, steps 402, 404, 405, 406, 407 and 408 adopt one mask photolithograph process respectively, thus the manufacturing steps can be reduced and the production efficiency can be improved.

Exemplarily, in the forgoing manufacturing method, an order of partial steps may be changed, for example, step 406 may be performed right after step 404, then the insulating layer is formed, and then step 405 is performed, and afterwards, step 407 and step 408 are performed.

An embodiment of the invention provides a manufacturing method of an array substrate, which may be used for manufacturing the array substrate provided by the embodiment as shown in FIG. 4, and the manufacturing method comprises:

Step 401': providing a substrate.

Step 402': forming a pattern including a gate line and a touch control driving line.

Wherein, the touch control driving line and the gate line are arranged in the same layer and are arranged at an interval.

Exemplarily, if a common electrode signal line and the gate line are arranged in a same layer, the pattern formed in step 402' further includes the common electrode signal line.

Step 403': forming a gate insulating layer.

Step 404': forming an active layer.

Step 405': forming a pixel electrode.

Step 406': forming a pattern including a source electrode, a drain electrode, and a data line.

Step 407': forming an insulating layer, and forming a through hole at a position corresponding to the touch control driving line in the insulating layer.

Step 408': forming a common electrode layer including a plurality of touch control driving electrodes and a plurality of common electrodes insulated to each other, the touch control driving electrodes and the common electrodes being arranged in an intersecting manner, the touch control driving electrodes being used for loading a common electrode signal and a touch control scanning signal in a time-sequence manner, each touch control driving electrode including a plurality of touch control driving sub-electrodes which are arranged along an extending direction of the touch control driving electrode at an interval, each of the touch control driving sub-electrode being positioned between adjacent common electrodes, and all of the touch control driving sub-electrodes of each touch control driving electrode being electrically connected by a plurality of touch control driving lines.

In the above steps, steps 402', 404', 405', 406', 407' and 408' adopt one mask photolithograph process respectively, and the manufacturing process has fewer steps, thus improving production efficiency.

Exemplarily, in the forgoing manufacturing method, an order of a part of the steps may be changed, for example, step 406' may be performed right after step 404', then the insulating layer is formed, and then step 405' is performed, and afterwards, step 407' and step 408' are performed.

Figure 5:
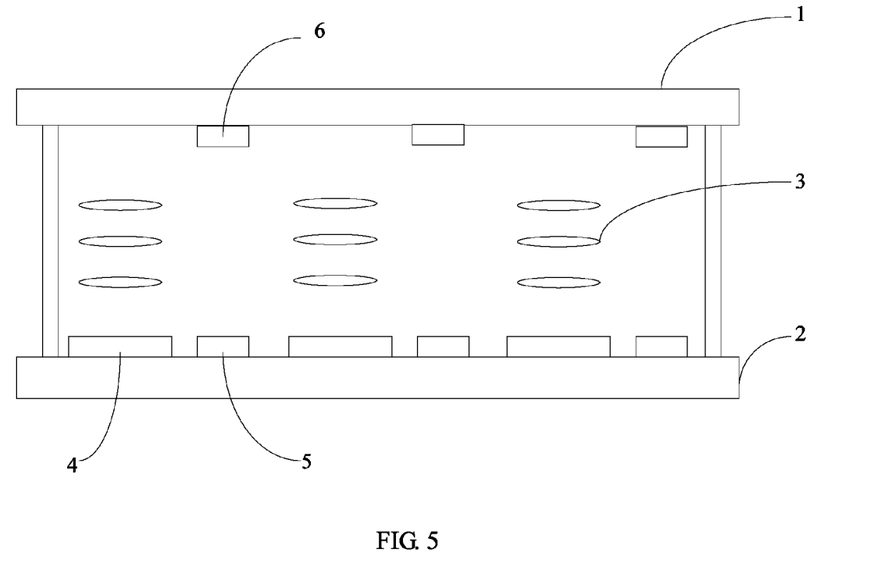
FIG. 5 is a cross-sectional structural diagram of a touch control display device provided by an embodiment of the invention.

An embodiment of the invention further provides a touch control display device, namely, a capacitive in-cell touch panel; with reference to FIG. 5, the touch control display device comprises an opposed substrate 1, an array substrate 2 and a liquid crystal layer 3 located between the opposed substrate 1 and the array substrate 2, and the array substrate is the array substrate provided by any embodiment described above. The array substrate comprises a common electrode layer, the common electrode layer including touch control driving electrodes 4 and common electrodes 5, of which the arrangement manner refers to the forgoing embodiments and will not be repeated here.

Wherein, the opposed substrate 1 includes a plurality of touch control sensing electrodes 6, and an orthogonal projection of each of the touch control sensing electrodes 6 on the array substrate is located in a region in which the common electrodes 5 are disposed, which thus avoids a facing area between the touch control sensing electrode 6 and the touch control driving electrode 4, so as to avoid overlapping of the touch control sensing electrode 6 and the touch control driving electrode 4; wherein the touch control sensing electrode 6 and the touch control driving electrode 4 are perpendicular to each other in extending direction, so touch control sensing accuracy can be improved.

The opposed substrate 2 may be a color filter substrate. At this time, the touch control sensing electrode is located on the color filter substrate, while the touch control driving electrode is located on the array substrate, and the touch control display device is an in-cell touch panel of an Advanced Super Dimension Switch (ADS) type. Wherein, an ADS technology generates a multi-dimensional electric field by an electric field generated at an edge of slit electrodes in a same plane and an electric field generated between a slit electrode layer and a plate-shaped electrode layer, so liquid crystal molecules oriented in any direction between the slit electrodes and right above the electrodes in a liquid crystal cell can rotate, so as to improve a liquid crystal working efficiency and light transmission efficiency. The ADS technology can improve the picture quality of a Thin Film Transistor-Liquid Crystal Display (TFT-LCD) product, which has advantages such as high resolution, high transmittance, low power consumption, wide viewing angle, high aperture ratio, low aberration, no push Mura and the like.

The touch control sensing electrode may be located in a black matrix region of the color filter substrate, so as not to influence the aperture ratio of the display device and the light transmittance of the display device. Exemplarily, the touch control sensing electrode may be located between a base substrate and the black matrix region of the color filter substrate, or may be located on one surface of the black matrix region of the color filter substrate facing the liquid crystal layer.

Exemplarily, the touch control display device provided by the embodiment of the invention may be any product or part having a display function, such as a mobile phone, a tablet computer, a television, a monitor, a laptop, a digital photo frame and a navigator.

An embodiment of the invention further provides a touch control driving method based on the array substrate or the touch control display device with forgoing structure, and the touch control driving method comprises:

Step 601: in a display period, applying a common electrode signal to the touch control driving electrode;

Step 602: in a touch control period, applying a touch control scanning signal to the touch control driving electrode and at least one of the data line and the gate line.

Figure 6:
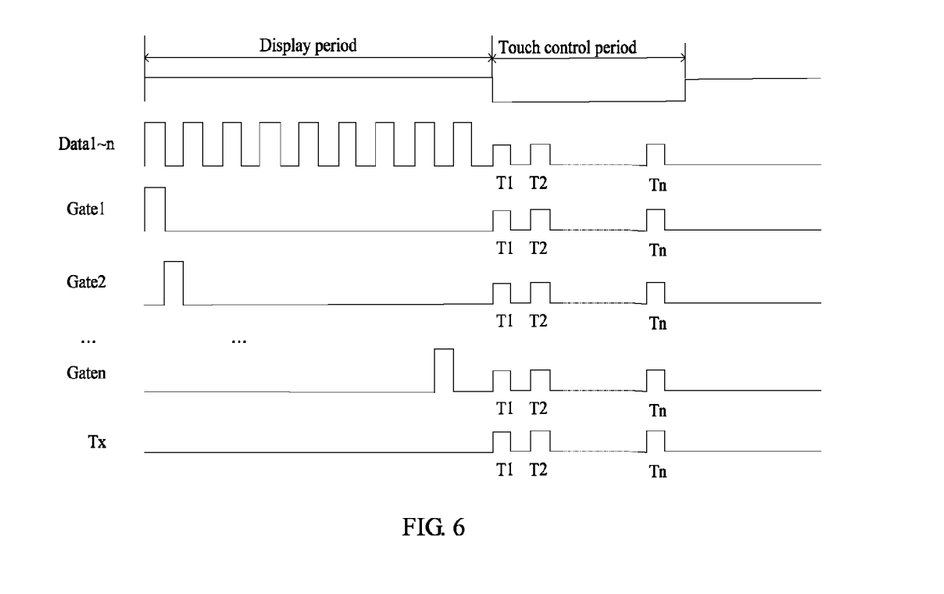
FIG. 6 is a driving time sequence diagram of a touch control driving method provided by an embodiment of the invention.

In combination with a driving time sequence as shown in FIG. 6, time that the touch panel displays each frame is divided into a display period and a touch control period. In the display period, a gate scanning signal is applied to each of gate lines Gate 1, Gate Gate 2 . . . Gaten in the touch panel in sequence, gray scale signals are applied to data lines Data1-$n$; correspondingly, at the moment, the touch control driving electrode Tx serves as a common electrode, and an IC chip connected with the touch control driving electrode provides a constant common electrode signal for the common electrode, to implement a liquid crystal display function. In the touch control period, the IC chip connected with the touch control driving electrodes provides touch control scanning signals T1, T2 . . . Tn for the touch control driving electrodes, and meanwhile the touch control sensing electrode detects the touch control sensing signal, to implement a touch control function. In the touch control period, no signal is input to each of the gate lines and the data lines in the touch control display device. In addition, the common electrode signal is always loaded to the common electrodes in the common electrode layer during the display period and the touch control period, or, the common electrode signal is loaded to the common electrodes in the display period, and the common electrodes are grounded or subjected to suspending treatment in the touch control period, and the suspending treatment means no signal input. In FIG. 6, in the touch control period, the touch control scanning signal is applied to the data lines, the gate lines and the touch control driving electrodes at the same time. At this moment, the data lines, the gate lines and the touch control driving electrodes are equipotential, so no parasitic capacitance exists between the touch control driving electrode and the data line and between the touch control driving electrode and the gate line, thus further reducing a signal transmission load.

Exemplarily, in the touch control period, the touch control scanning signal is applied to only the data lines and the touch control driving electrodes at the same time; at this time, most of parasitic capacitance can be eliminated, and crosstalk between the touch control driving line and the gate line generated when the touch control driving signal is applied to the gate lines can be avoided.

The foregoing are merely preferred embodiments of the invention, and not intended to limit the invention; and any modification, equivalent replacement, improvement and the like, within the spirit and principle of the invention, fall into the protection scope of the invention.

This application claims the priority benefit of Chinese Patent Application No. 201510126520.1 filed on Mar. 23, 2015, the disclosure of which is incorporated herein as a part of the application in its entirety by reference.

What is claimed is:

1. An array substrate, comprising:
a common electrode layer, comprising:
a plurality of touch control driving electrodes and a plurality of common electrodes which are insulated from one another and are arranged in an intersecting manner within the same common electrode layer, the touch control driving electrodes being configured to load a common electrode signal and a touch control scanning signal in a time-sequence manner, each touch control driving electrode comprising a plurality of touch control driving sub-electrodes which are arranged along an extending direction of the touch control driving electrode at an interval, and each touch control driving sub-electrode being positioned between adjacent common electrodes;
a plurality of pixel units, arrayed in a matrix and are defined by a plurality of gate lines and a plurality of data lines intersecting with each other; and
a plurality of touch control driving lines arranged in a same layer as the data lines or the gate lines of the array substrate, the plurality of touch control driving lines being parallel to each other, and an extending direction of each touch control driving line being same as the extending direction of the touch control driving electrode,
wherein the plurality of touch control driving sub-electrodes comprised in each of the touch control driving electrodes are electrically connected by more than one of the touch control driving lines, and both ends of the more than one of the touch control driving lines electrically connected with one touch control driving electrode are connected together, and
wherein one touch control driving line is arranged between every two adjacent pixel units in a direction perpendicular to the extending direction of the touch control driving lines.

2. The array substrate according to claim 1, wherein each of the touch control driving lines, electrically connected with one touch control driving electrode is connected with each of the plurality of touch control driving sub-electrodes, comprised in the one touch control driving electrode, through at least one through hole.

3. The array substrate according to claim 1, wherein the touch control driving line is of a Mo/Al/Mo laminated structure.

4. The array substrate according to claim 1, wherein in a case that the touch control driving lines and the data lines are arranged in a same layer, the common electrodes extend along a row direction of the pixel units, and the touch control driving electrodes extend along a column direction of the pixel units.

5. The array substrate according to claim 1, wherein in a case that the touch control driving lines and the gate lines are arranged in a same layer, the common electrodes extend along a column direction of the pixel units and the touch control driving electrodes extend along a row direction of the pixel units.

6. The array substrate according to claim 4, further comprising a plurality of common electrode signal lines, each of the common electrodes being electrically connected with one of the plurality of common electrode signal lines.

7. The array substrate according to claim 4, further comprising a plurality of common electrode signal lines, more than one of the common electrodes being electrically connected with one of the plurality of common electrode signal lines.

8. A touch control display device, comprising:
an opposed substrate; and
an array substrate, cell-assembled with the opposed substrate,
wherein the array substrate is the array substrate according to claim 1.

9. The touch control display device according to claim 8, wherein the opposed substrate comprises a plurality of touch control sensing electrodes, and an orthogonal projection of each of the touch control sensing electrodes on the array substrate is located in a region in which the common electrodes are disposed.

10. The touch control display device according to claim 9, wherein an extending direction of each of the touch control sensing electrodes is perpendicular to the extending direction of each of the touch control driving electrodes.

11. The touch control display device according to claim 10, wherein the opposed substrate is a color filter substrate.

12. The touch control display device according to claim 11, wherein the touch control sensing electrodes are positioned in a black matrix region of the color filter substrate.

13. A touch control driving method of the touch control display device according to claim 8, comprising:
   in a display period, applying a common electrode signal to the touch control driving electrodes; and
   in a touch control period, applying a touch control scanning signal to the touch control driving electrodes and the data lines and/or the gate lines.

14. The touch control driving method according to claim 13, wherein in the touch control period, the touch control scanning signal is applied to the data lines and the touch control driving electrodes.

* * * * *